Oct. 13, 1964     H. MANDLINGER ETAL     3,152,676
SYNCHRONIZING RING
Filed March 27, 1961
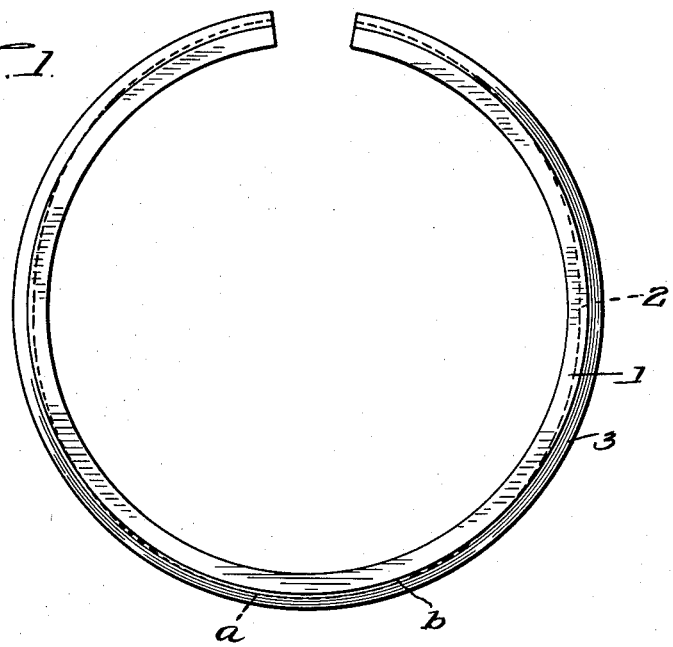
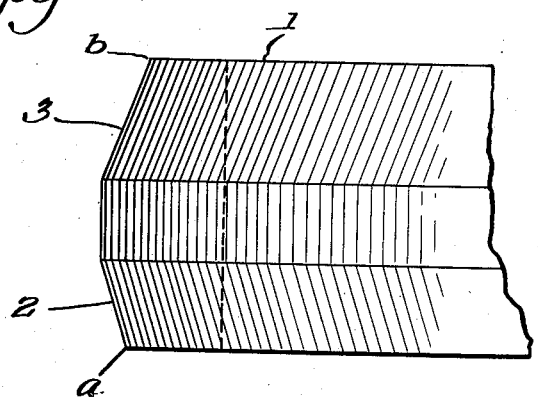
Inventors.
Heinrich Mandlinger &
Helmuth Kreuzer.
By．．．．．．．．．．．．．．．Atty.

United States Patent Office 3,152,676
Patented Oct. 13, 1964

3,152,676
SYNCHRONIZING RING
Heinrich Mandlinger, Burscheid, near Cologne, and Helmuth Kreuzer, Hoxter (Weser), Germany, assignors to Goetzewerke Friedrich Goetze Aktiengesellschaft, Burscheid, near Cologne, Germany, a corporation of Germany
Filed Mar. 27, 1961, Ser. No. 98,391
Claims priority, application Germany, Apr. 27, 1960, G 29,545
5 Claims. (Cl. 192—107)

This invention is concerned with a slotted synchronizing ring for speed change gears, especially gears for motor vehicles, such ring being affected by servo action which increases its blocking effect.

Known slotted synchron rings are provided with a superficies which is conically shaped at each end thereof, one conical portion of the superficies acting for the centering of the ring and the other for the synchronization. In order to ensure sufficient synchronizing action, a further ring was provided between the clutch carrier and the synchronizing ring, such further ring being operative to increase the servo action. Moreover, the superficies of the ring was coated with molybdenum so as to reduce the relatively great wear.

The present invention proceeds from the thought that the useful life of the ring depends less upon the wearproof protective coating but more upon the configuration of the superficies which exerts a much greater influence. It is in accordance with the invention proposed to provide a slotted synchronizing ring which is in tensioned condition of circular configuration at the synchronizing side thereof. This ensures engagement of the clutch sleeve circularly with the synchronizing part over as wide a surface as possible. The wear at the endangered zones is moreover considerably reduced. A wearproof protective coating of molybdenum, if such is used, may be made considerably thinner, thus enabling more economical production of the ring. It is also possible, in the absence of excessive requirements as to useful life, to make the synchronizing superficies of circular configuration merely within the portions of the two abutting ends and of the back of the ring. It is furthermore possible to make the clutch sleeve surface, which is respectively associated with the synchronizing superficies, correspondingly circular, so as to obtain an optimum operative effect.

It has been found advantageous to make the other superficies, which serves for the centering, of a configuration which deviates from circular in the tensioned condition of the ring. The resulting ring does not instantly fully grip and therefore can execute the slight tangential motion which is required for the servo action. The centering surfaces preferably engage the cooperatively associated machine part at a plurality of points, especially three points or regions, two of such points being in the region of the abutment gap and one point being in the region of the back of the ring. An identical action can also be achieved by making the clutch body, respectively associated with the synchronizing ring, of a configuration deviating from circular, while making the synchronizing ring of a configuration such that it is circular on the centering side also in the tensioned condition thereof.

The configuration of the ring according to the invention can be easily determined. There is one characteristic, according to which the diameter of the ring is in unassembled state or untensioned, measured parallel to the abutment gap, between the ends formed by the axially extending slot, on the average greater than along a line extending transverse to the abutment gap displaced therefrom (and said first-mentioned diameter) by 90°. Another characteristic can be determined at the superficies of the ring since the edges do not extend uniformly along the periphery. This is particularly true with respect to the portion on the synchronizing side, which, in such untensioned state, extends approximately undulating over the periphery, most closely approaching a circular path or configuration within the regions of the abutment ends formed by the slot and the region of the back of the ring diametrically opposite the slot. The ring can be provided in known manner with a uniform wearproof coating of molybdenum. However, it is particularly for reasons of economy advantageous to provide the ring with such a coating only within the operatively active portions of the superficies.

In the fabrication of the ring, the superficies serving for the synchronization is preferably first circularly machined in tensioned condition of the ring, whereby customary tolerances can of course be applied without affecting the ring in the operation thereof. The other superficies which serves for the centering is however machined circularly in untensioned condition of the ring, such other superficies becoming in operative position of the ring oval and engaging the machine part associated therewith only pointwise.

An embodiment of the invention is illustrated in the accompanying drawing, wherein FIG. 1 shows a complete synchronizing ring in end view thereof; and FIG. 2 shows the synchronizing ring partially in cross-sectional view.

Referring now to the drawing, the synchronizing ring 1 is provided with conical superficies 2 and 3, the superficies 2 serving for the centering and the superficies 3 for the synchronizing. The active edges of the superficies at the adjacent axial end faces of the ring are indicated at a and b. It will be seen, particularly from FIG. 1, that these edges have different contours. The ring is shown in FIG. 1 in tensioned condition and the edge b on the synchronizing side accordingly extends circularly while the edge a on the centering side extends along an oval path. The greater part of the centering action is effected in the region of the abutment ends and in the region of the back of the ring diametrically opposite the slot and these regions are therefore protected against wear, for example, by a molybdenum coating vaporized thereon.

Changes may be made within the scope and spirit of the appended claims which define what is believed to be new and desired to have protected by Letters Patent.

We claim:

1. A slotted synchronizing ring for speed change gears, especially for motor vehicles, such ring being slotted in axial direction and affected by servo action, the superficies of said ring being of conical configuration at each axial end face thereof, to serve respectively for synchronizing and centering, the superficies serving for synchronizing extending in tensioned condition of said ring along a circular path, and the superficies which serves for the centering is of a configuration deviating in tensioned condition of the ring from the circular path.

2. A slotted synchronizing ring according to claim 1, wherein the synchronizing surface, in untensioned condition of the ring, most closely approaches a circular path within the region of the abutment ends formed by said axially directed slot and the region of the back of the ring diametrically opposite said slot.

3. A slotted synchronizing ring according to claim 1, wherein the synchronizing surface, in untensioned condition of the ring, most closely approaches a circular path within the region of the abutment ends formed by said axially directed slot and the region of the back of the ring diametrically opposite said slot, the part of the superficies which serves for the centering being of a circular configuration in the untensioned condition of the ring.

4. A slotted synchronizing ring according to claim 1, wherein the synchronizing surface, in untensioned condition of the ring, most closely approaches a circular path within the region of the back of the ring diametrically opposite said axially directed slot, the part of the superficies which serves for the centering being of a configuration deviating in tensioned condition of the ring from the circular path, such latter part engaging the machine part cooperatively associated therewith at three points, two of said points being located at the abutment ends formed by said slot and one point being located along the back of the ring diametrically opposite said slot.

5. A slotted synchronizing ring according to claim 1, the diameter of which is in non-assembled condition, as measured parallel to the abutment gap greater than the diameter thereof measured transverse to the abutment gap along a line extending 90° displaced with respect to the abutment gap and said first mentioned diameter.

References Cited in the file of this patent

UNITED STATES PATENTS

| | | |
|---|---|---|
| 2,078,020 | Ridgeway | Apr. 20, 1937 |
| 2,579,090 | Rabe | Dec. 18, 1951 |